United States Patent [19]

Martina

[11] Patent Number: 5,506,388
[45] Date of Patent: Apr. 9, 1996

[54] HOT BOWL FOR CIGARETTE LIGHTERS, HAVING A BENT LUG FOR SECURING AN END OF A SPIRAL WOUND ELECTRIC HEATING ELEMENT

[75] Inventor: Felice Martina, Turino, Italy

[73] Assignee: Imos Italia S.r.l., Caselette, Italy

[21] Appl. No.: 132,476

[22] Filed: Oct. 6, 1993

[30] Foreign Application Priority Data

Oct. 30, 1992 [IT] Italy .............................. T092U0258 U

[51] Int. Cl.⁶ ...................................................... F23Q 7/22
[52] U.S. Cl. ........................................................... 219/270
[58] Field of Search .................................. 219/260–270; 361/264–266

[56] References Cited

U.S. PATENT DOCUMENTS

| | | |
|---|---|---|
| 1,803,361 | 5/1931 | Stearns . |
| 1,946,434 | 2/1934 | Bach ....................... 219/270 |
| 2,663,606 | 12/1953 | Cronan . |
| 2,975,262 | 3/1961 | Schnick ................... 219/270 |
| 3,383,494 | 5/1968 | Hubert ..................... 219/270 |
| 3,909,587 | 9/1975 | Mattis . |
| 3,958,099 | 5/1976 | Mattis ..................... 219/270 |
| 4,007,353 | 2/1977 | Horwitt ................... 219/270 |
| 5,132,517 | 7/1992 | Von Gaisberg et al. ........ 219/270 |

FOREIGN PATENT DOCUMENTS

0178119A3   4/1986   European Pat. Off. .

Primary Examiner—John A. Jeffery
Attorney, Agent, or Firm—Merchant, Gould, Smith, Edell, Welter & Schmidt

[57] ABSTRACT

Hot bowl of a cigarette lighter body in particular of the type mounted on motor vehicles, its perimetral surface comprising a bendable lug which pinches one end of the spiral resistance element contained within the lighter by a crimping process.

1 Claim, 1 Drawing Sheet

HOT BOWL FOR CIGARETTE LIGHTERS, HAVING A BENT LUG FOR SECURING AN END OF A SPIRAL WOUND ELECTRIC HEATING ELEMENT

BACKGROUND OF THE INVENTION

This invention relates to hot bowls for cigarette lighters, particularly of the type mounted on motor vehicles, and in particular relates to the system for fixing the spiral resistance element into the hot bowl.

Various methods of fixing the resistance element are known in the art, one of which uses an elastic ring which compresses the spiral against the inner wall of the hot bowl. Apart from the increased cost due to the elastic ring, this method of fixing involves an operation which is not easy to execute automatically, namely the insertion of the elastic ring into the wall of the hot bowl. The most usual system for fixing the end of the resistance element to the interior of the hot bowl is welding. However this system is subject to certain drawbacks. The first is that the welding can present problems of current passage through the insulating layer of the resistance element. The second problem, and perhaps the more important, is that because of the hardening procedure normally undergone by the wall of the hot bowl the welding cannot be reliably effected, with the result that because of the continuous temperature variations the resistance element becomes detached during the product life.

SUMMARY OF THE INVENTION

The object of the present invention is therefore to provide a system for fixing the spiral resistance element into the hot bowl of the cigarette lighter body which does not present the aforesaid problems and is of simple and inexpensive implementation.

Said object is attained according to the present invention by the use of a hot bowl for the pusher assembly of a cigarette lighter in particular mounted on motor vehicles and provided with a spiral resistance element connected electrically at two points, characterised in that the hot bowl comprises a bendable lug on its perimetral surface, one end of the spiral resistance element being pinched between said lug and the wall of the hot bowl by a crimping process.

Two important functional advantages are obtained by virtue of said characteristic.

Firstly the direct crimping of the last turn of the resistance element overcomes said detachment problems arising from unreliable welding. Secondly, durable and stable fixing is achieved by a very simple operation of very low cost.

BRIEF DESCRIPTION OF THE DRAWINGS

Further characteristics and advantages of the invention will be apparent from the description given hereinafter by way of nonlimiting example with reference to the accompanying drawing, comprising two figures indicated by 1 and 2, and of which.

DETAILED DESCRIPTION OF THE PREFERRED EMBODIMENT

Figure 1:
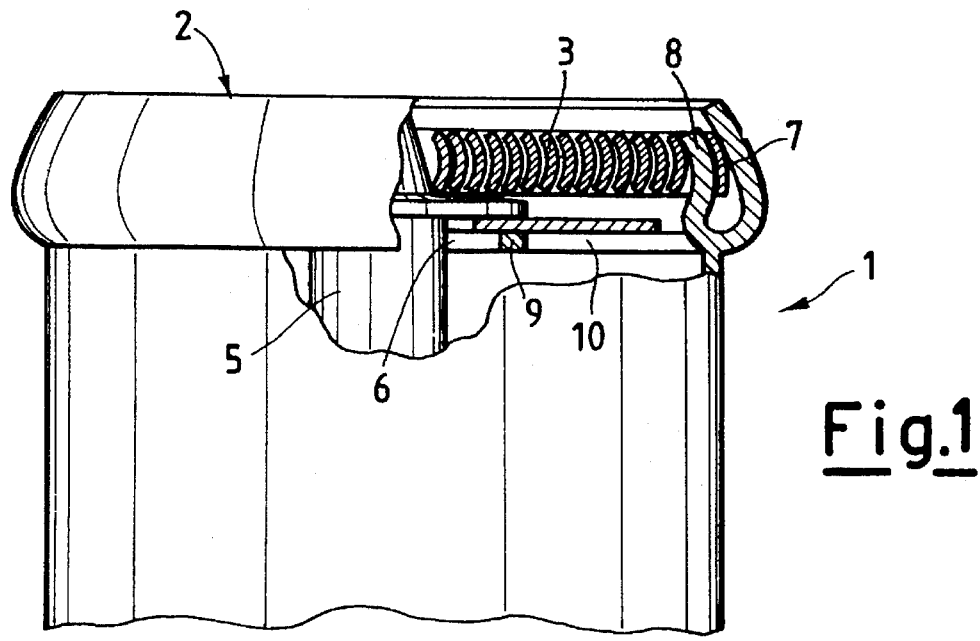
FIG. 1 is an elevated side view, being partially removed away, of a hot bowl according to the invention.
Figure 2:
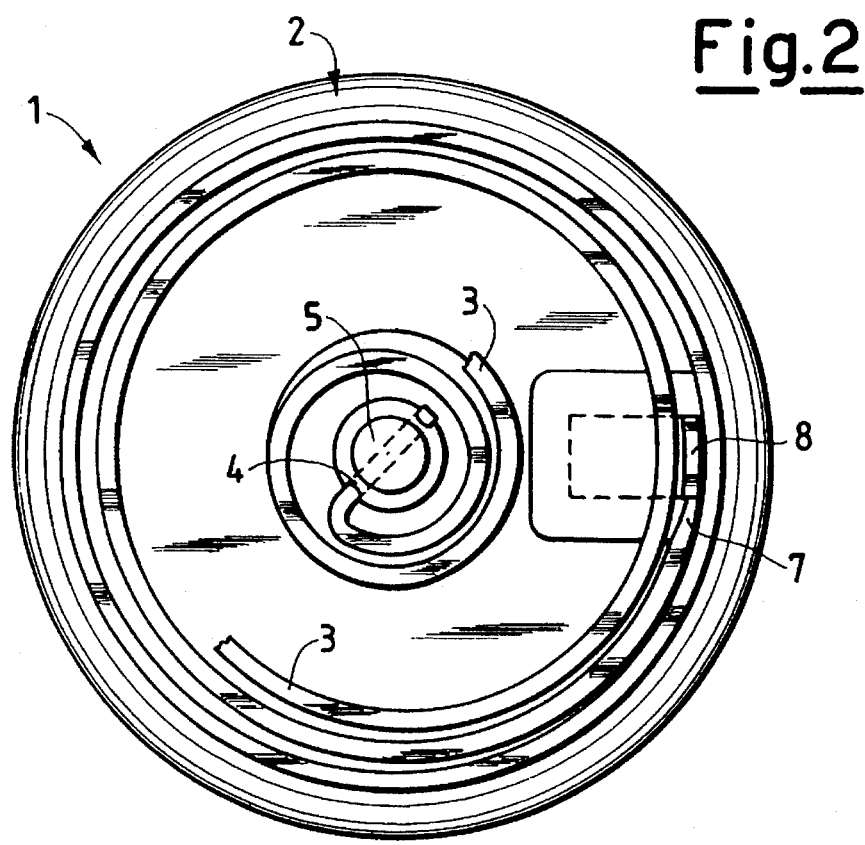
FIG. 2 is a plan view of the hot bowl of FIG. 1.

In the figures the reference numeral 1 indicates overall the body of a cigarette lighter of the type mounted on motor vehicles but not shown in its entirety, with which there is associated a hot bowl 2 formed from sheet metal bent into cup shape. Within the hot bowl 2 there is positioned a spiral resistance element 3 fixed at its inner end 4 to a conductor shaft 5 inserted into a base 9 of the hot bowl 2 via a hole 6 provided in its center. The conductor shaft 5 forms the first of the two electrical contacts to which the spiral resistance element 3 is connected. The second electrical contact is provided by the connection of the second end 7 of the spiral resistance element 3 to the inner wall of the hot bowl 2. The second connection is made by crimping a lug 8 integral with the lateral wall of the hot bowl 2, by bending it over so that it pinches the end of the spiral between itself and the inner wall of the hot bowl.

For a better understanding of the advantages of the invention a description will now be given of one of the possible procedures for forming a hot bowl according to the invention.

The procedure consists of a first stage in which a flat sheet metal disc is formed by blanking. Said disc is then punched to obtain a U-shaped aperture 10 close to the outer wall of the disc. Said aperture defines the lug 8 which is later bent over to lock (by a crimping procedure) the outer end 7 of the spiral 3. The external shape of the cup-shaped hot bowl is then obtained by deep-drawing. At this point the spiral is inserted into the hot bowl and crimping is then effected in the aforesaid manner by bending the lug over. The conductor shaft is then inserted into the hole and fixed to the other end of the spiral resistance element 3.

It should be noted that the lug 8 can be formed by different methods without leaving the scope of the present invention. The effects of the invention also extend to those models which achieve an equivalent use based on the same inventive concept.

I claim:

1. A spiral wound electric heating assembly for a cigarette lighter, comprising:
   a spiral resistance heating element having a first inner end electrically connected to a central terminal conductor shaft, and a second outer end;
   an electrically conductive cup-shaped hot bowl electrically insulated from said central terminal conductor shaft, said hot bowl including a lateral wall and a base which is integral with the lateral wall, said spiral resistance heating element being carried by said hot bowl, said second outer end being electrically connected to an inner side of said lateral wall; and
   the base being punched to form an inner bendable lug and an aperture defined therefrom proximate to the inner side of the lateral wall, the inner bendable lug being bent to pinch said second outer end between said lug and the inner side of said lateral wall.

* * * * *